United States Patent [19]

Tsutsui et al.

[11] Patent Number: 4,879,100
[45] Date of Patent: * Nov. 7, 1989

[54] CORONA DISCHARGE TREATMENT APPARATUS

[75] Inventors: Koichi Tsutsui, Kyoto; Shoji Ikeda; Koji Ueki, both of Osaka, all of Japan

[73] Assignee: Nippon Paint Co., Ltd., Osaka, Japan

[*] Notice: The portion of the term of this patent subsequent to Sep. 20, 2005 has been disclaimed.

[21] Appl. No.: 122,158

[22] Filed: Nov. 17, 1987

[30] Foreign Application Priority Data

Dec. 23, 1986 [JP] Japan ................. 61-306749

[51] Int. Cl.$^4$ ............. B01J 19/08; H01T 19/04
[52] U.S. Cl. ................. 422/186.05; 250/324; 250/325; 422/907
[58] Field of Search .......... 422/186.05, 186.06, 422/907, 186.13; 204/164, 165; 250/324, 325, 326; 361/225, 230

[56] References Cited

U.S. PATENT DOCUMENTS

| | | |
|---|---|---|
| 2,550,366 | 4/1951 | Meaker et al. . |
| 3,146,385 | 8/1964 | Carlson . |
| 3,183,352 | 5/1965 | Brandt et al. . |
| 3,203,809 | 8/1965 | Visness et al. . |
| 3,233,156 | 2/1966 | Jarvis et al. . |
| 3,254,215 | 5/1966 | Oliphant . |
| 3,293,652 | 12/1966 | Roshon et al. . |
| 3,402,279 | 9/1968 | Sazhin . |
| 3,405,052 | 10/1968 | Schirmer . |
| 3,483,374 | 12/1969 | Erben . |
| 3,777,164 | 12/1973 | Osman . |
| 3,794,839 | 2/1974 | Hayne . |
| 4,028,551 | 6/1977 | Thompson . |
| 4,049,414 | 9/1977 | Smith . |
| 4,064,386 | 12/1977 | Numrich, Jr. . |
| 4,103,137 | 7/1978 | Levitt et al. . |
| 4,275,301 | 6/1981 | Rueggeberg . |
| 4,298,440 | 11/1981 | Hood . |
| 4,403,168 | 9/1983 | van Leeuwen . |
| 4,425,496 | 1/1984 | le Fur et al. . |
| 4,467,200 | 8/1984 | Kalwar et al. . |
| 4,555,171 | 11/1985 | Clouthier et al. . |
| 4,710,358 | 12/1987 | Neuhaus . |
| 4,772,788 | 9/1988 | Tsutsui et al. ............ 250/324 |

FOREIGN PATENT DOCUMENTS

0055686 8/1981 European Pat. Off. .
3343063 6/1985 Fed. Rep. of Germany .

Primary Examiner—John F. Terapane
Assistant Examiner—Susan Wolffe
Attorney, Agent, or Firm—Armstrong, Nikaido, Marmelstein, Kubovcik & Murray

[57] ABSTRACT

To perform a corona discharge treatment, a high voltage needs to be impressed between a base electrode and a discharge electrode. One of the electrodes is linked to a high frequency and high voltage source, and the other electrode is grounded. When the electrode linked to the source is moved to be accommodated to a surface to be treated of an object, accidents of an electric shock or a short-circuit often result from an unexpected contact of the electrode on an operator or installation, or a troubles often result from spark or coming-part of contacts. In this invention, one of the electrodes is linked to the source and immovably arranged, while the other is grounded and is allowed to make the movement for accommodating the surface to be treated of the object and the discharge electrode to each other. According to the corona discharge treatment apparatus of this invention, such accidents as an electric shock or a short-circuit, etc., are foreclosed, and troubles are reduced.

7 Claims, 8 Drawing Sheets

CORONA DISCHARGE TREATMENT APPARATUS

BACKGROUND OF THE INVENTION

This invention relates to a corona discharge treatment apparatus used for activating a surface of an object to be treated to improve its surface property.

For example, automobile bumpers made of polyolefine material, etc., are subjected to corona discharge treatment for improvement their surface properties. As an apparatus for making this corona discharge treatment, there has been developed one that is equipped not only with a base electrode for coming in contact with an object but also with a discharge electrode for impressing a high voltage between it and the aforementioned base electrode, and which is adapted to activate a surface to be treated of the object by taking advantage of the corona discharge phenomenon that occurs when the high voltage is impressed between the aforementioned two electrodes, with the surface to be treated of the object and the aforementioned discharge electrode accommodated to each other.

To perform such a corona discharge treatment, a high voltage needs to be impressed between the base electrode and the discharge electrode. In order to conduct this, one of the electrodes must be linked to a high frequency and high voltage source, and the other electrode must be grounded. If the object has many surfaces to be treated, it is necessary, at every treatment of each surface to be treated, to vary a direction, etc., of the object or the electrode to be linked to the high frequency and high voltage source, thereby accommodating the surface to be treated of the object and the electrode to be linked to the high frequency and high voltage source to each other. In the aforementioned corona discharge treatment apparatus, this movement for accommodation has been provided by moving the electrode to be linked to the high frequency and high voltage source. For such a corona discharge treatment apparatus, an example appears in Japanese Patent Publication (examined) No. 60-46133. In the corona discharge treatment apparatus shown in the Patent Publication No. 60-46133, a base electrode is installed on a support and on this base electrode, an object is mounted; upward thereof, there is arranged an opposite electrode (discharge electrode) which has a flexible discharge device and is linked to the high frequency and high voltage source. A surface to be treated of the object and the discharge device are accommodated to each other by moving on a straight line or rotating the support together with the base electrode, or by moving up-down, swiveling or rotating the opposite electrode together with the discharge device, so that each surface to be treated of the object having many faces may be collectively and concentrically subjected to the discharge treatment. Further, in another corona discharge treatment apparatus which was developed separately from the corona discharge treatment apparatus shown in the Patent Publication No. 60-46133, an electrode to be linked to the high frequency and high voltage source is also designed to be vibrated for enhancing the effect of the corona discharge treatment. However, since such conventional corona discharge treatment apparatuses are designed to allow the electrode to be linked to the high frequency and high voltage source to be moved, accidents of an electric shock or a short-circuit often result from an unexpected contact of the electrode on an operator or installation, or troubles often result from spark or coming-apart of contacts.

OBJECT OF THE INVENTION

The object of this invention is to provide a corona discharge treatment apparatus which is free of accidents such as an electric shock or a short-circuit and which involves little possibility of trouble.

BRIEF DESCRIPTION OF THE DRAWINGS

FIG. 1 represents an example of the corona discharge treatment apparatus of this invention, (a) of this figure showing its front view and (b) its side view;

FIG. 2 shows the discharge electrode 2 and a part of the electrode fitting members of the aforementioned example, (a) of this figure giving their plane view, and (b) a sectional view taken along the line X - X';

FIG. 5 portrays another example, (a) of this figure showing its front view, and (b) its side view.

DETAILED DESCRIPTION OF THE INVENTION

In order to attain the aforementioned object, this invention provides a corona discharge treatment apparatus which is equipped not only with a base electrode for coming in contact with the object to be treated but also with a discharge electrode for impressing a high voltage between it and the aforementioned base electrode, and which is adapted to activate a surface to be treated of the object by taking advantage of a corona discharge phenomenon that occurs when the high voltage is impressed between the aforementioned two electrodes, with the surface to be treated of the object and the aforementioned discharge electrode accommodated to each other, characterized in that one of the aforementioned two electrodes is linked to a high frequency and high voltage source and immovably arranged, while the other is grounded, and that only this latter electrode is allowed to make the movement for accommodating the surface to be treated of the object and the discharge electrode to each other.

Figure 1A:
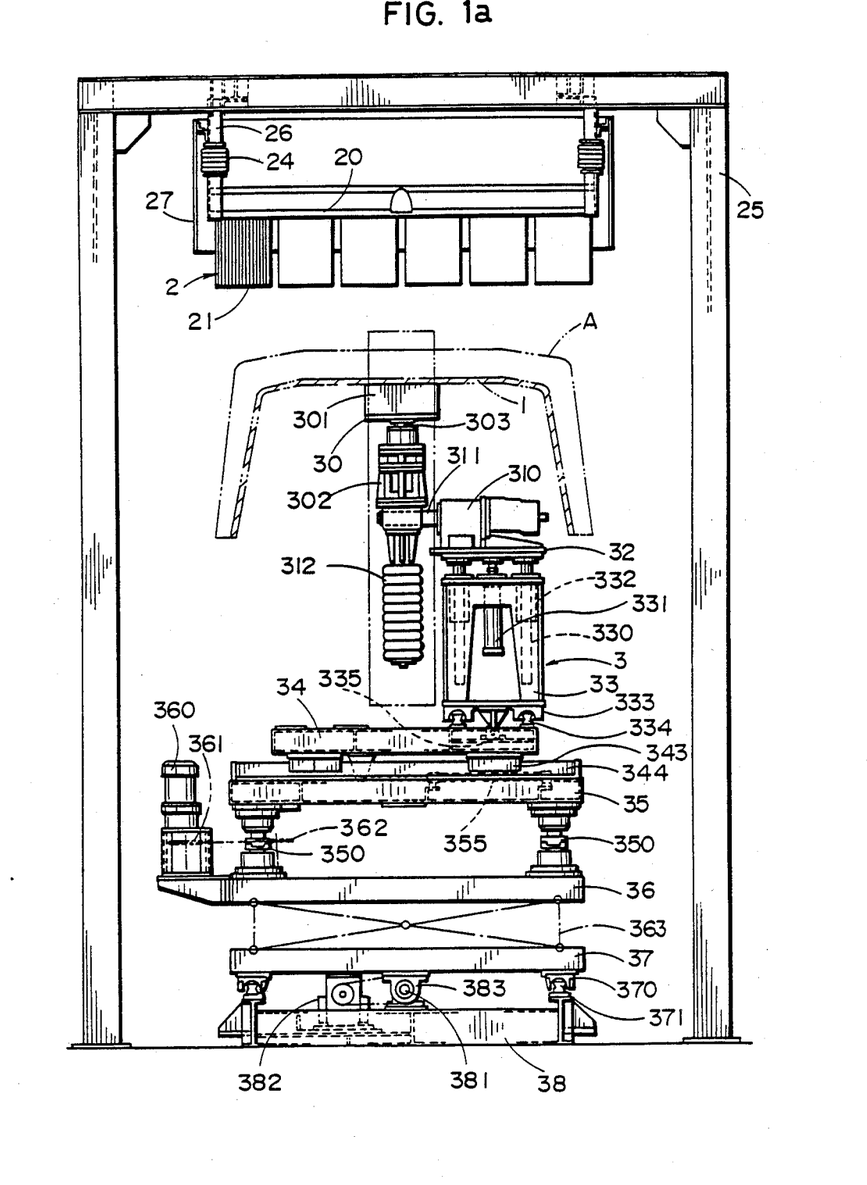
Figure 1B:
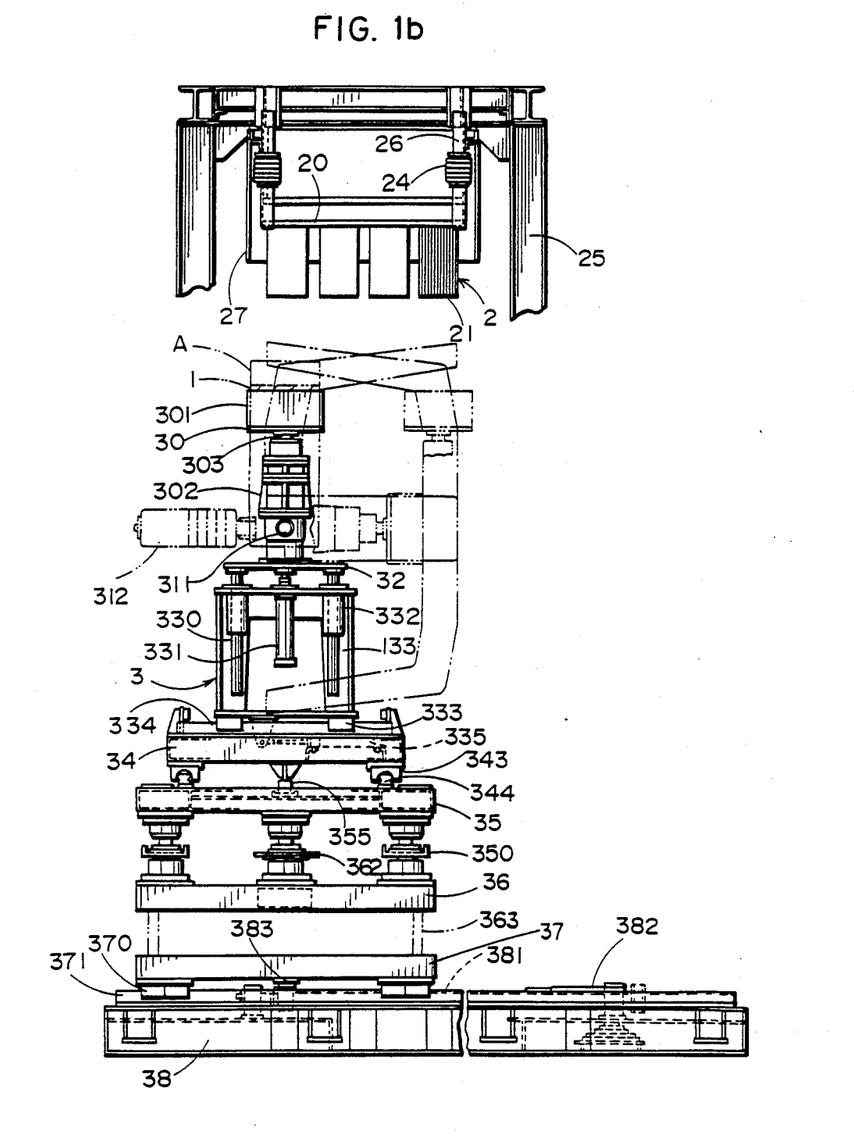
Figure 2A:
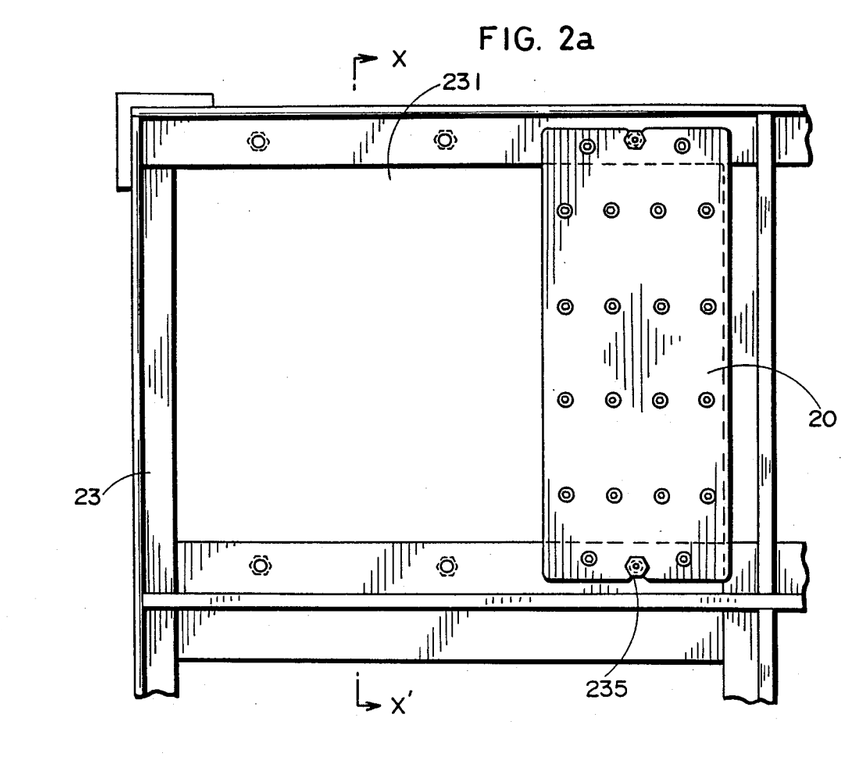
Figure 2B:
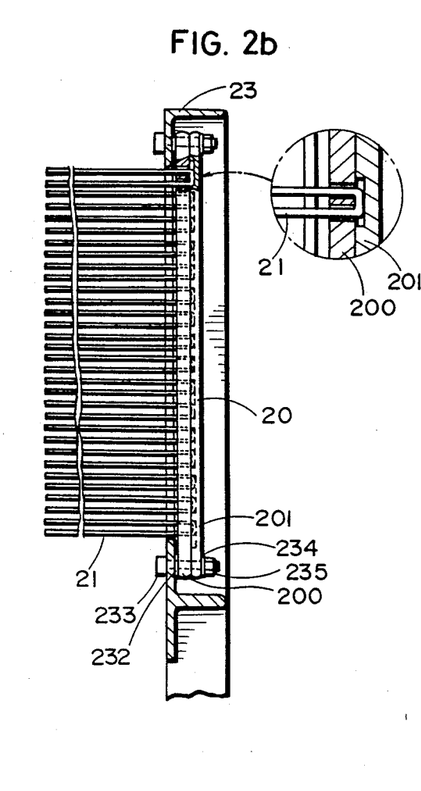
Figure 3:
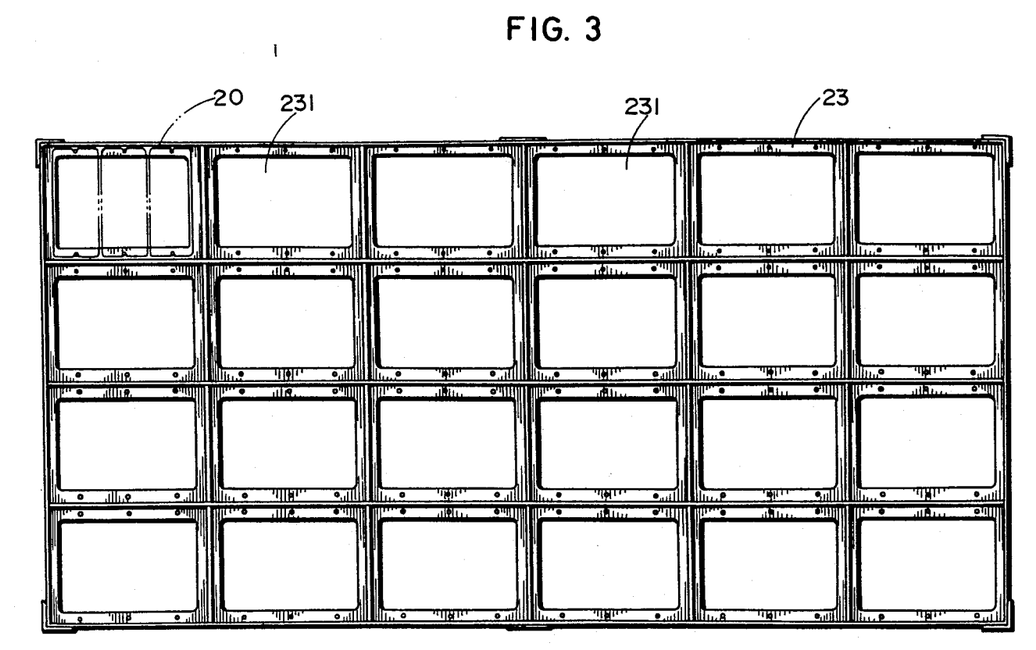
FIG. 3 is a plane view showing the electrode fitting members of the aforementioned example.

FIGS. 1 (a) and (b) represent an embodiment of the corona discharge treatment apparatus of this invention. As shown in these Figures, this corona discharge treatment apparatus is equipped with a base electrode 1 for coming in contact with the object A, a discharge electrode 2 for impressing a high voltage between it and this base electrode, and an operation stand (operating means) 3 for mounting the base electrode 1 and the object A. In this example, the object A is an automobile bumper made of polyolefine resin material, which has a large number of surfaces to be treated which are looking different directions. The base electrode 1 has a surface configuration matched to the configuration of the inside surface of the object A, to be in contact with the inside surface of the object A, and is grounded through an operation stand 3. This base electrode 1 is formed of a plastic mold and a conductive metal layer formed by applying a conductive coating on its surface which is looking toward the object. As the way of applying the conductive coating, a method based on electroless plating is employed in this embodiment, but the method is not limited to electroless plating. For example, a method based on coating of conductive paint, a method based on vapor deposition or a method based on sticking of aluminum foil or conductive tape may also be employed. The base electrode may also be composed with a conductive mold of, for example, aluminum material, and the like. As shown in FIGS. 2 (a) and (b), the discharge electrode 2 is composed of an electrode wire fitting member 20 and a large number of electrode wires 21 fitted thereto and drooping therefrom. The electrode wire fitting member 20 is composed of an electrode wire supporting plate 200, FIG. 2b, and an electrode wire setting plate 201. These two plates 200 and 201 hold therebetween the bent portion of the electrode wire 21 bent in U-shape. The length of the drooping part of the electrode wire 21 is, for example, 50 to 600 mm. The discharge electrode 2 is mounted on an electrode mounting frame 23, as shown in FIG. 3. In this electrode mounting frame 23, a large number of windows 231 are formed. In each window 231, three discharge electrodes 2 are fitted, respectively. This fitting is done, as shown in FIGS. 2 (a) and (b), by inserting a spacer 232 made of rubber between the electrode mounting frame 23 and the electrode wire fitting member 20 and fastening the electrode mounting frame 23 and the electrode wire fitting member 20 by means of bolts 233, nuts 234 and washers 235. Since the discharge electrode 2 is mounted in this way, it is possible to provide the discharge electrode 2 at the required position and over the required area. The discharge electrode 2 is linked to the high frequency and high voltage source, not shown in these figures, so that the impressing of the high voltage may be done from the electrode wires 21. The electrode mounting frame 23 is hung from a supporting frame 26 held by a treatment housing 25 through insulating glass pieces 24. The discharge electrode 2 and the electrode mounting frame 23, exclusive of the tip portions of the electrode wires 21, are surrounded with an acryl plate 27. As hereabovedescribed, the discharge electrode 2 is linked to the high frequency and high voltage source and immovably arranged at a high level.

The operation stand 3 is equipped with a head part 30 on which the base electrode 1 and the object A are mounted. The head part 30 is provided with a grounding portion 301 and is designed to be rotatable over 90 Degrees around a shaft 303 by a torque actuator 302 with cushions. The speed of this rotation is set at 3 to 5 mm/sec, for example. The head part 30 is mounted on the rotor 311 of the torque actuator 310 with 3 point stop cushions, to be tiltable by 180° fore - aft (one side 90° ) around the rotor 311. The tilting speed is, for example, 6 to 12 mm/sec. On the opposite side relative to the head part 30 across the rotor 311, a balance weight 312 is fitted to the rotor 311 in such a way as to take its balance with the head part, thereby making the tilting of the head part 30 smooth. The torque actuator 310 is mounted on an up-down vibrating stand 32. On the bottom surface of this up down vibrating stand 32, a rod of a hydraulic cylinder 331 fixed on a fore-aft movable stand 33 and a guide bar 330 are fitted. The guide bar 330 is passed through a guide cylinder 332 of the fore-aft movable stand 33, to be slidable up-down. By the operation of the hydraulic cylinder 331, this up-down vibrating stand 32 is designed to make up-down vibration, for example, with a stroke of 200 mm and at a speed of 2 to 5 mm/sec. The fore-aft movable stand 33 is mounted on a right-left transfer stand 34 through a slide bearings 333 and slide rails 334 and designed to be moved fore-aft, for example, with a stroke of 200 mm and at a speed of 2 to 10 mm/sec, by the working of a hydraulic cylinder 335 fixed on the right-left transfer stand 34. The right-left transfer stand 34 is mounted on a horizontal vibrating stand 35 through slide bearings 343 and slide rails 344 and is designed to move right-left, for example, with a stroke of 400 mm and at a speed of 4 to 20 mm/sec, by the working of a hydraulic cylinder 355 fixed on the horizontal vibrating stand 35. The horizontal vibrating stand 35 is mounted on an up-down movable stand 36 through link balls 350. The drive of three-phase geared motor 360 fixed on the up-down movable stand 36 is transmitted through sprockets 361 and 362, to be horizontally vibrated at a rate of 20 to 80 rpm, for example. The up-down movable stand 36 is mounted on a conveyor stand 37 through a hydraulic lifter 363, to be moved up-down, for example, with a stroke of 800 mm and at a speed of 10 to 15 mm/sec, by the working of the hydraulic lifter 363. The conveyor stand 37 is mounted on a base 38 through slide bearings 370 and slide rails 371. On the base 38, a ball screw 381 is arranged in the direction along the slide rails 371. This ball screw 381 is designed to be rotated by a three-phase geared motor with a brake 382. To this ball screw 381, a ball screw nut 383 is meshed. The ball screw nut 383 is fitted to the conveyor stand 37, so that as the ball screw 381 is turned normal-reverse, the conveyor stand 37 is moved fore-aft, for example, with a stroke of 2,320 mm and at a speed of 13 mm/sec (180 mm/sec max.). This transfer movement is employed when the object A is conveyed into or out of this apparatus.

Figure 4:
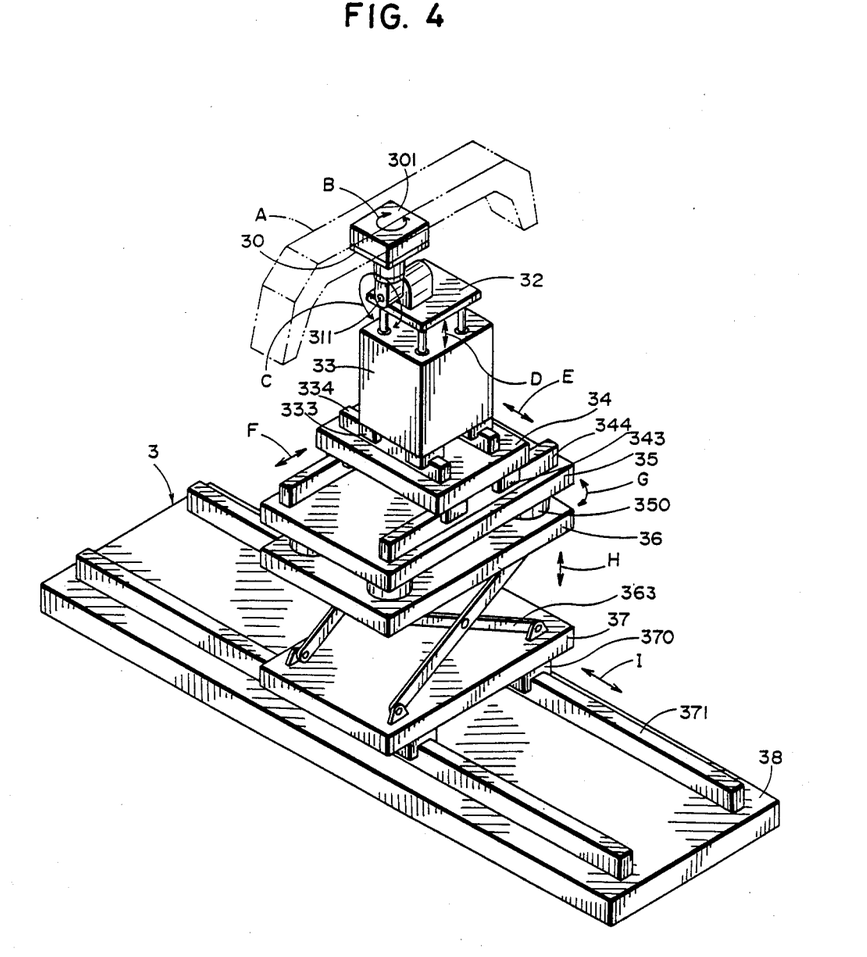
FIG. 4 is a view for explanation of the movement of the operation stand 3 of the aforementioned example.

The operation stand 3, being composed as hereabovedescribed, is adapted to make rotational movement B, tilting movement C, up-down vibratring movement D, fore-aft transfer movement E, right-left transfer movement F, horizontal vibrating movement G, up-down shifting movement H and conveying in-out movement I. The base electrode 1 and the object A installed on the operation stand 3 are to be moved by the operation stand 3 making these movements. In order to activate the surface to be treated of the object A, the discharge electrode 2 and the surface to be treated of the object A need to be accommodated to each other. The movement of the base elctrode 1 effected by the rotational movement B, the tilting movement C, the fore-aft transfer movement E, the right-left transfer movement F, the up-down shifting movement H and the conveying in-out movement I, of the aforementioned movements, serves as the movement for accommodating the discharge electrode 2 and the surface to be treated of the object A to each other (hereinafter referred to as "accommodating movement"). That is, this corona discharge treatment apparatus makes the corona discharge treatment with the discharge electrode 2 and the surface to be treated of the object A accommodated to each other for whatever posture of the surface to be treated, either upward or side-looking, by effecting the accommodating movement of the base electrode 1, making use of the aforementioned various movements of the operation stand 3. The up-down vibrating movement D and the horizontal vibrating movement G are movements for vibrating the object A, with which to enhance the effect of the corona discharge treatment.

As hereabove described, this corona discharge treatment apparatus is of a design such that the discharge electrode 2 is linked to the high frequency and high voltage source and immovably arranged, while its base electrode 1 is grounded and only this base electrode 1 is allowed to make the movement for accommodating the surface to be treated of the object A and the discharge electrode 2 to each other. Since, as above-described, the electrode to be linked to the high frequency and high voltage source is immovably installed and only the electrode to be grounded is moved, the possibility that the electrode to be linked to the high frequency and high voltage source might touch on an operator or installation is substantially eliminated, affording freedom from an electric shock or a short-circuit. Besides, the possibility of spark or coming-apart of contacts is foreclosed, obviating the need for care about trouble. Further, if the electrode to be linked to the high frequency and high voltage source is placed at a high level as in this embodiment, the possibility of its touching on the operator, etc., will be further reduced to the benefit of safety. In order to keep the discharge electrode 2 immovable, it is of course preferable to have the operation stand 3 make the vibrating movements, as in this embodiment, for enhancing the effect of the corona discharge treatment.

Figure 5A:
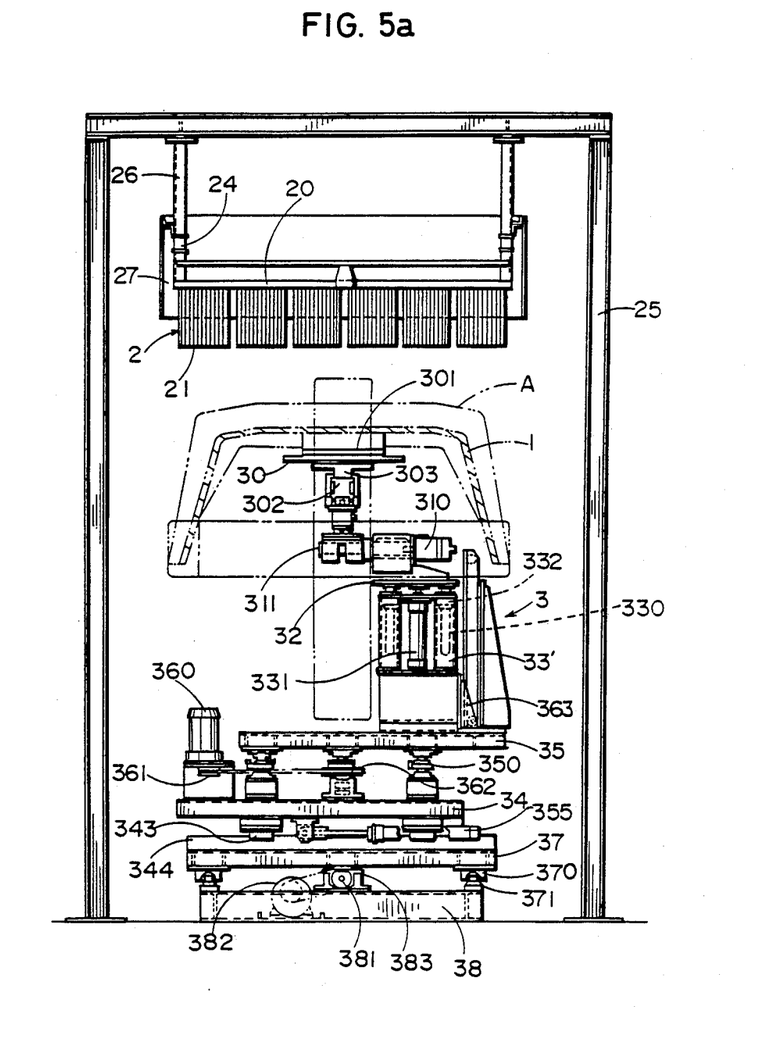
Figure 5B:
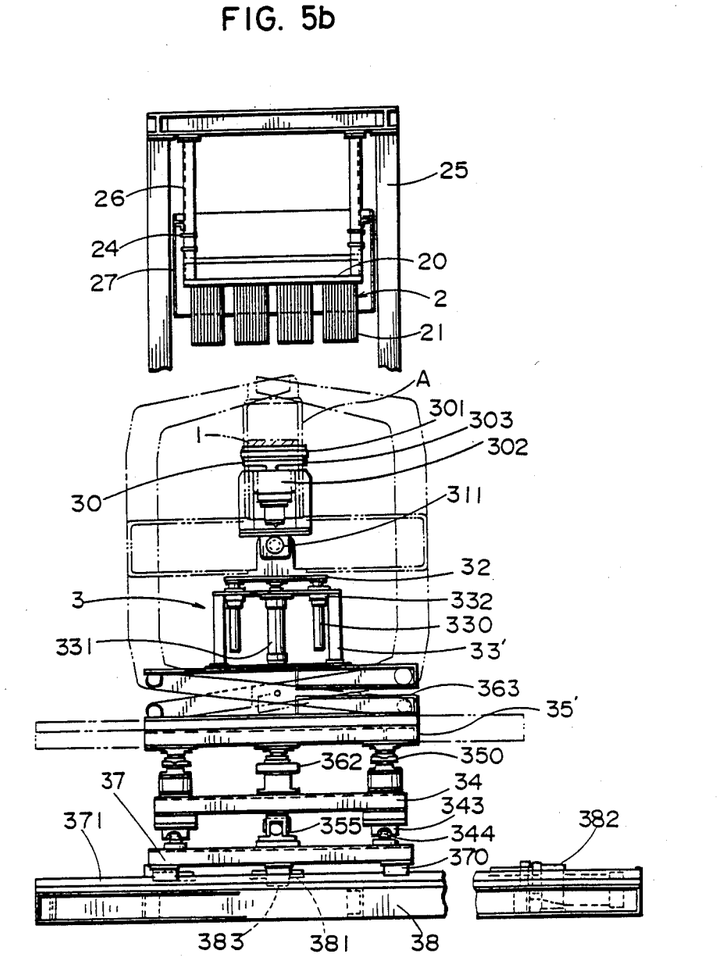

FIG. 5 represents another embodiment. As shown in these Figures, the conveying in-out movement I is doubled as the fore-aft transfer movement E in this embodiment. That is, moving the object A fore-aft for accommodating the surface to be treated of the object A and the discharge electrode 2 to each other is done by making use of the conveying in-out movement I. In this embodiment, between the up-down vibrating movement mechanism and the horizontal vibrating movement mechanism, a hydraulic lifter 363 being an up-down shifting movement mechanism is provided and between the conveying in-out movement mechanism and the horizontal vibrating movement mechanism, a right left transfer movement mechanism is installed. Other arrangements are nearly similarly composed as in the aforementioned embodiment, although the configurations are somewhat different. In the figures, 33' denotes a supporting stand for up-down vibration. In this embodiment, for example, respective movements are conducted under the undermentioned conditions. The rotational movement is made with the rotational angle 90° and the rotational speed 3 to 5 mm/sec. The tilting movement is performed with the tilting angle 180° and the tilting velocity 6 to 12 mm/sec. The up down vibrating movement is conducted with the stroke 220 mm and the velocity of vibration 2 to 5 mm/sec. The up-down shifting movement is made with the stroke 800 mm and the shifting speed 12 to 20 mm/sec. The right-left transfer movement is performed with the stroke 400 mm and the transfer speed 2 to 5 mm/sec. The horizontal vibrating movement is made with the eccentricity width 10 to 15 mm and the velocity of vibration 20 to 80 rpm. The conveying in-out movement is executed with the stroke 2,000 mm and the transfer speed 10 to 20 mm/sec.

Figure 6:
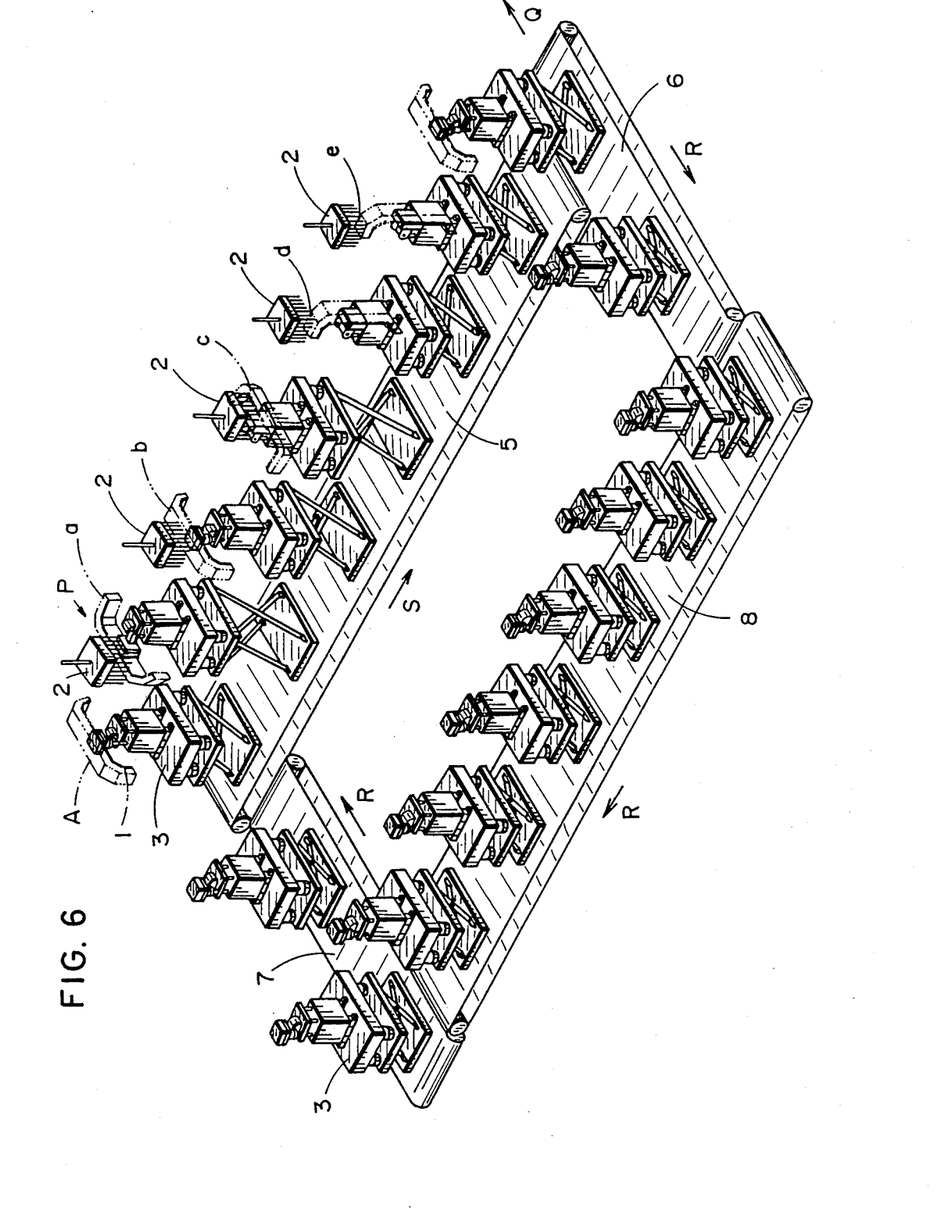
FIG. 6 is a perspective view showing in a simplified form an example in which a group of such apparatuses are arranged along a continuous line.

The apparatuses of the aforementioned two embodiments are designed to make the treatment of all surfaces to be treated of the object A on the operation stand 3 of a single unit. But, as shown in FIG. 6, the treatment may be continuously made on a plurality of operation stands 3. In this embodiment, as shown in FIG. 6, a plurality of the discharge electrode 2 are arranged along the transfer directions of the transfer means (a conveyor) 5. Each of these discharge electrodes 2 is linked to the high frequency and high voltage source and immovably arranged at a high level, to activate only a part of the surface to be treated of the object A. That is, the discharge electrodes arranged along the transfer direction are intended to take on activation of, successively, a first side face a, an upper face b, a second side face c, a first rising face d and a second rising face e of the object A. The ranges over which these discharge electrodes 2 are arranged are called, sequentially in the transfer direction S, a first side face treating zone, an upper face treating zone, a second face treating zone, a first rising face treating zone and a second rising face treating zone. On a conveyor type transfer means 5, a plurality of the operation stands 3 are carried. These operation stands 3 are cyclically transferred by a ringed line composed, as indicated by the arrow mark R, of two load conveyors 6 and 7 so installed as to be coupled to the terminal and starting parts of the transfer means 5 and another conveyor 8 which joints these conveyors 6 and 7. These transfer means 5, discharge electrodes 2, etc., are put in a housing (not shown in this figure). The base electrode 1 is fixed integrally with the object A and grounded through the operation stand 3. The object A, as shown in FIG. 6, is introduced from the direction of the arrow mark P to the aforementioned transfer means 5, then, successively carried in the direction of the arrow mark S, during which time period, the object A is tilted to have its first side face a turned upward in the first side face treating zone, the upper face b in the upper face treating zone, the second side face c in the second side face treating zone, the first outer side face d in the first rising face treating zone, and the second outer side face e in the second rising face treating zone, respectively. In each treating zone, the base electrode 1 is caused to make the accommodating movement by the movement of the operation stand 3 made as desired, thereby accommodating the discharge electrode 2 and the surface to be treated of the object A to each other. When a high voltage is impressed between the two electrodes 1 and 2 in this way, the surface of the object A in contact with the electrode wires 21 of the discharge electrode 2 is subjected to the discharge treatment. The object A which has been subjected to the surface treatment in respective treating zones is to be taken out in the direction of the arrow mark Q as shown in FIG. 6. When the corona discharge treatment is conducted along a continuous line, as shown in FIG. 6, the discharge treatment can be efficiently made in an industrial scale.

For enhancing the effect of the corona discharge treatment, blowing-out of gas toward the surface of the object A may be done. When the gas is blown onto the surface to be treated of the object A, the activation of the surface to be treated is adequately promoted and the surface property is effectively improved, this improvement being achieved with small power consumption. Particularly, when the gas such as air or oxygen is utilized, such gas as air or oxygen is not blown against the surface of the object A as it is, but it is first passed around the electrode and turned into ozone, which is then blown against the surface of the object A, for more adequately achieving the aforementioned activation.

Blowing of the gas after warmed increases the effect of treatment, leading to curtailment of treating time. Preferable temperature range is 30° to 100° C. As the gas to be blown against the discharging part, such gas as nitrogen, oxygen, carbon dioxide, carbon monoxide, ammonia, oxides of nitrogen, halogenated carbons, halogenated hydrocarbons, vinyl compounds, argon or helium, besides air, may be used singly or in combination of two or more members of them, to serve the ends of respective surface treatments.

In this invention, the movement for accommodating the discharge electrode 2 and the surface to be treated of the object A to each other includes not only the movement for transferring the object A before and after its corona discharge treatment, but also the transfer movement of the discharge electrode 2 before and after the corona discharge, when the base electrode 1 and the object A are immovably arranged. And further, the above movement includes the movement of the object A along the discharge electrode 2 or the movement of the discharge electrode 2 along the object A during its corona discharge treatment, which may be required when the discharge electrode is smaller than the surface to be treated of the object A.

For the electrode wire 21 used in this invention, for example, a string into which a large number of conductive monofilaments of stainless steel are plied is used. As such a monofilament, an austenitic stainless steel fiber (JIS SUS 27-43), trade name "NASLON" manufactured by Nippon Seisen Co., Ltd., for example, is preferably used. The number of filaments to be plied is 10 to 3,000. When the electrode wire 21 is composed of a large number of monofilaments having an ultra-fine diameter plied together, an electrode wire obtained is not fragile nor too stiff, but has some handle and makes a slight touch on the surface of the object A and, moreover, stable and secure contact is attainable because the wire 21 is formed of a large number of monofilaments. By this, not only the discharge effect is stabilized as well as ensured, but neither the electrode wire 21 nor the object A will sustain injury. With a large number of monofilaments used, but merely bundled without being plied, similar discharge effect may be obtained. However, its liability to fluffing detracts from its use as electrode wire.

The aforementioned electrode wire 21 may be a fine chain formed by connecting links of iron, brass, aluminum or preferably, stainless steel, etc. As a link of this chain, one having a length of 0.2 to 10 mm in the connecting direction and that of 0.1 to 5 mm in the direction criss-crossing the connecting direction is employed.

It is preferable that the high voltage source used for the corona discharge treatment usually gives a voltage of 10kV to 50 kV, preferably 10 kV to 30 kV, and a frequency of 1 kHz to 100 kHz. The power supply output may be appropriately selected to meet the purpose. As the power supply circuit, conventional known one may be used. However, it is desirable that such a circuit allows the discharge current which brings about plasmageneration to be arbitrarily controlled to meet the load requirement and also permit the frequency and the output of the high voltage source to be adjusted to their optimal levels. Besides, it is desirable to control the treating time to a specified time period by arbitrarily setting the time period for delivery of high voltage by way of making the setting on a timer. If a stabilizing power source is provided in an electric circuit for impressing high voltage, even a surface formed in a complex shape may be uniformly subjected to the plasma treatment.

The corona discharge treatment apparatus of this invention is not limited to the examples hereabovedescribed. The discharge electrode 2 may be set with its electrode wire fitting member 20 inclined. On the surface of the base electrode 1, a layer of dielectric substances such as, for example, glass, ceramics, plastics, enamel, asbestos, marble, slate, mica may be formed, as required, for attainment of uniform plasma treatment by prevention of local field concentration. Besides, although the base electrode 1 of the above-mentioned examples is placed integrally with the object A, it may be unified with the operation stand 3 or merely carried on the operation stand 3.

Although, in the above-described examples, the discharge electrode 2 is linked to the high frequency and high voltage source and immovably set and the base electrode 1 is grounded and adapted for movement by means of the operation stand (operating means) 3, it is also adaptable that the base electrode 1 is linked to the high frequency and high voltage source and immovably held and the discharge electrode 2 is grounded and designed to be movable by the operating means 3. In this case, the discharge electrode 2 may be vibrated by some operating means 3 for enhancing the effect of the corona discharge treatment.

As explained in the foregoing, since the corona discharge treatment apparatus of this invention is the corona discharge treatment apparatus equipped not only with the base electrode 1 for coming in contact with the object A to be treated but also with the discharge electrode 2 for impressing a high voltage between it and the aforementioned base electrode 1, and which is adapted to activate the surface to be treated of the object A by taking advantage of the corona discharge phenomenon that occurs when the high voltage is impressed between the aforementioned two electrodes, with the surface to be treated of the object A and the aforementioned discharge electrode 2 accommodated to each other, characterized in that one of the aforementioned two electrodes is linked to the high frequency and high voltage source and immovably arranged, while the other is grounded, and that only this latter electrode is allowed to make the movement for accommodating the surface to be treated of the object A and the discharge electrode 2 to each other, such accidents as an electric shock or a short-circuit, etc., are foreclosed, and troubles are reduced.

We claim:

1. A corona discharge treatment apparatus for corona discharge treatment of the surface of an object, said apparatus comprising:

a plurality of treating zones positioned one treating zone after the other, each treating zone being arranged for treating a different part of the surface of the object to be treated;

transfer means for moving said object to be treated into each of said treating zones, one of said each treating zone after the other, for treating said different part of said surface in said treating zone and for moving said object into the next treating zone for treating another different part of said surface in said next treating zone and for repeating said moving, said treating and said moving into said next treating zone until all of said different parts of said object to be treated are treated;

a first electrode for contacting said object while said surface of said object is treated in each one of said treatment zones;

a second electrode immovably mounted in each said treating zone and responsive with said first electrode for impressing high voltage between said first electrode and said second electrode and to said different part of said surface of said object being treated in said each said treating zone for treatment of said different part of said surface of said object while said object is in said each treating zone; and a high frequency and high voltage source connected in said each treating zone with said second electrode while said first electrode is grounded, for providing a corona discharge between said first electrode and said second electrode in said each treating zone and to said different part of said surface of said object being treated therein.

2. An apparatus as recited in claim 1 in which said object to be treated is supported in said each of said treating zones by one of said first and second electrodes and said apparatus further comprises means for adjusting said one of said electrodes for moving and positioning said object relative to the other of said electrodes for positioning said different part of said surface of said object to be treated in said treating zone in position for said corona discharge treatment.

3. An apparatus, as recited in claim 2, in which said one of said first and second electrodes is grounded.

4. An apparatus, as recited in claim 1, in which said first electrode is a base electrode and said second electrode is a discharge electrode and said discharge electrode is connected to said high frequency and high voltage source.

5. An apparatus, as recited in claim 2 or 3, in which said adjusting means includes means for raising and lowering said one of said electrodes and said object.

6. An apparatus, as recited in claim 5, in which said one of said electrodes includes means for turning said object to expose the different part of said surface of said object to be treated to said second electrode and said corona discharge treatment.

7. An apparatus, as recited in claim 6, in which said adjusting means further includes means for vibrating said one of said electrodes.

* * * * *